No. 742,432. Patented October 27, 1903.

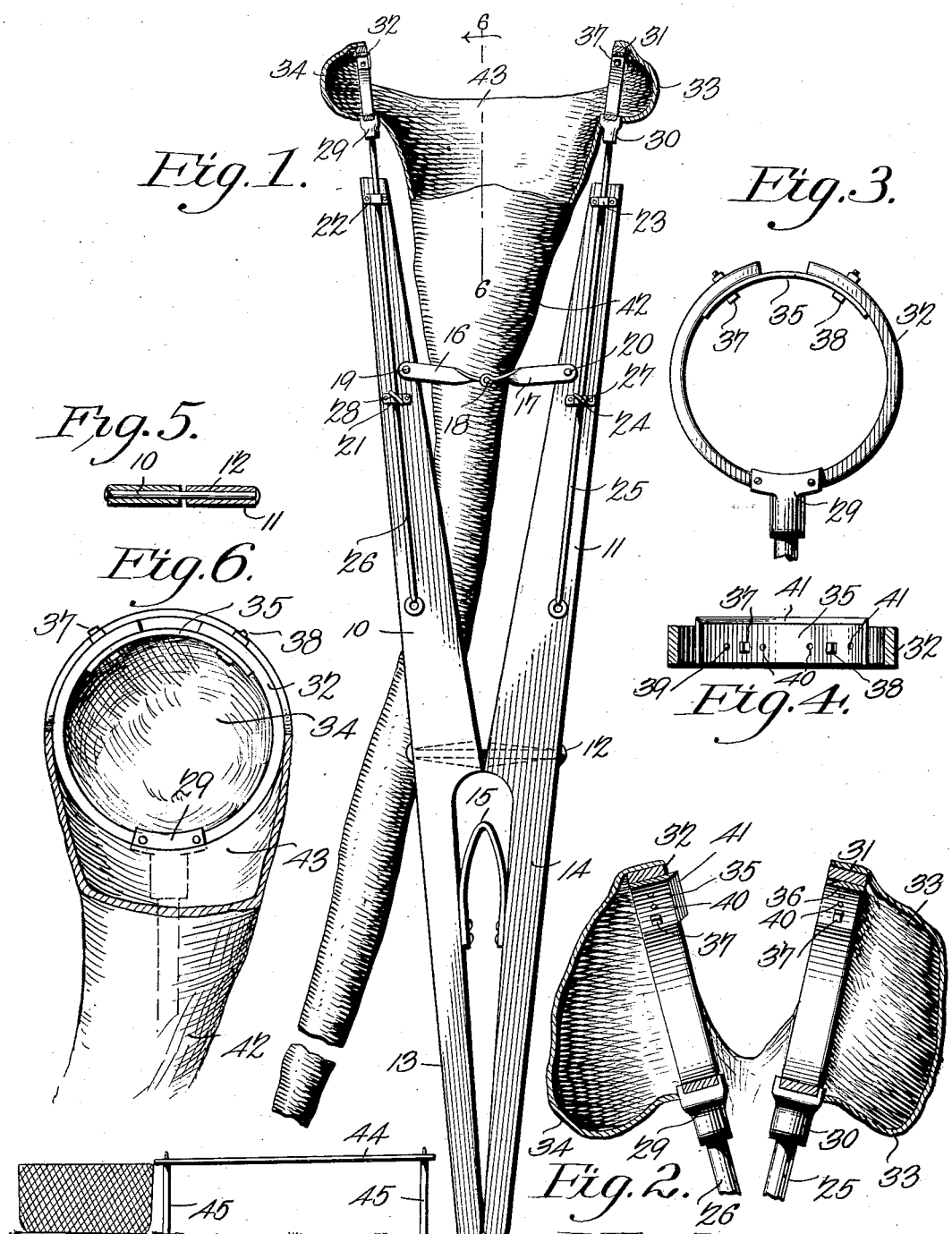

UNITED STATES PATENT OFFICE.

JACKSON HOPKINS, OF PEARIDGE, ARKANSAS, ASSIGNOR OF ONE-HALF TO FRANKLIN E. JOHNSON, OF BRIGHTWATER, ARKANSAS.

FRUIT-GATHERER.

SPECIFICATION forming part of Letters Patent No. 742,432, dated October 27, 1903.

Application filed May 28, 1903. Serial No. 159,203. (No model.)

*To all whom it may concern:*

Be it known that I, JACKSON HOPKINS, a citizen of the United States, residing at Pearidge, in the county of Benton and State of Arkansas, have invented a new and useful Fruit-Gatherer, of which the following is a specification.

This invention relates to implements for gathering fruit from trees, and has for its object to simplify and improve devices of this character and to produce an implement which may be adjusted longitudinally to adapt it to trees of various sizes and which may also be adjusted to adapt it to various sizes of fruit; and the invention consists in certain novel features of construction, as hereinafter shown and described, and specified in the claims.

In the drawings illustrative of the invention, in which corresponding parts are denoted by like designating characters, Figure 1 is a side elevation of the implement in its open position. Fig. 2 is an enlarged sectional detail of the picker members. Figs. 3 and 4 are enlarged details of one of the picker-member frames. Fig. 5 is a transverse section through the hinge portion of the operating-arms. Fig. 6 represents a detail section on line 6 6 of Fig. 1.

The improved device consists of two arms 10 11, pivotally united at 12 intermediately of their lengths and with the portion below the pivot cut away centrally to form handles 13 14, a spring 15 being interposed between the parts below the pivot or within the cavity formed by cutting the arms away to form the handles, as shown, the spring exerting its force to maintain the handle portions normally distended and the opposite free ends closed. The arms 10 11 above the pivot 12 are preferably tapered, as shown, and are connected by links 16 17, united, as by pivot-pin 18, and likewise pivotally united, as at 19 20, to the arms 10 11, as shown. The links thus serve to limit the outward movement of the arms 10 11 and also stiffen and strengthen the connection between the arms.

Attached to the arms 10 11 are spaced keepers 21 22 23 24, through which rods 25 26 pass, as shown, one of the keepers on each arm being provided, respectively, with set-screws 27 28, so that the rods may be locked at any desired point.

Attached, as by clips 29 30, to the rods 25 26 are the picker members, formed of divided rings 31 32, having cloth pockets 33 34 attached thereto and extending outwardly, the divided ends of the rings connected, respectively, by coupling-plates 35 36 and screws 37 38, the plates each having spaced screw-apertures, as shown at 39 40, so that the rings may be enlarged or reduced to increase or decrease the size. One of the plates will be distended laterally and sharpened, as at 41, and the other plate or the other ring will be provided with a cavity 42, into which the protruding portion 41 will extend when the device is closed. The portion 41 thus becomes a means for severing the stems of the fruit when the implement is operated. By this simple means the picker members may be adjusted longitudinally of the implement to adapt it to the height of the trees, and when the implement is to be operated it will be thrust among the branches in its closed position, the fabric hoods 33 34 collapsing if they come in contact with the limbs or leaves, and thus permitting the implement to be inserted through relatively narrow apertures, whereby any otherwise-inaccessible fruit may be readily reached without injury either to the implement or the tree. When the desired point of operation is reached, the handles 13 14 are compressed and the picker members separated and placed upon opposite sides of the fruit to be gathered. The handles are then released, when the spring 15 will forcibly close the picker members and cause the knife 41 to sever the stem and deposit the fruit in the pockets 33 34 without injury thereto and from which it may be removed in any manner desired. For choice delicate fruit the implement will be lowered and the fruit removed by again compressing the handles 13 14; but generally the implement will be provided with a tubular fabric conductor 42, connected by its upper open end 43 to the inner lower portions of the picker members, as shown, so that after the fruit has been plucked by the closing of the picker members the reopening of the same will release it and permit it to run down the conductor to the receptacle. By this means the fruit may be gathered nearly as fast as the implement can be opened and closed.

At the discharge end of the conductor 42 a fabric sheet or receiver 44 is stretched upon stakes 45, preferably in an inclined position, and adapted to receive the fruit and from which it will run into any suitable receptacle. The fruit will thus be gathered free from bruises and abrasions and with great expedition.

The implement can be manufactured of very light material, as the strains to which it will be subjected are not severe, and can also be manufactured very cheaply. The ring members 31 32 can thus be altered in diameter to adapt the implement to different sizes of fruit, so that the chances for bruising or abrasion are obviated.

Having thus described the invention, what I claim is—

1. In a fruit-gatherer, arms movably connected intermediately, oppositely-disposed picker members connected for adjustment longitudinally of said arms, means for yieldably maintaining said picker members normally closed, and adapted to be compressed to open said picker members.

2. In a fruit-gatherer, arms movably connected intermediately, rods connected for longitudinal adjustment relative to said arms, oppositely-disposed picker members connected with said rods, and means for yieldably maintaining said arms and picker members normally closed, substantially as described.

3. In a fruit-gatherer, arms movably connected intermediately, keepers spaced apart upon said arms, rods movably disposed through said keepers, means for locking said rods adjustably in said keepers, oppositely-disposed picker means carried by said rods, and means for yieldably maintaining said arms and picker members normally closed, substantially as described.

4. In a fruit-gatherer movably-connected arms having oppositely-disposed picker members connected for adjustment longitudinally of said arms.

5. In a fruit-gatherer, arms movably connected intermediately, oppositely-disposed picker members carried by said arms, means for yieldably maintaining said picker members normally closed, and links movably connected at their adjacent ends and likewise movably connected by their free ends with said arms, substantially as described.

6. In a fruit-gatherer, picker members formed of oppositely-disposed annular frames divided at one side, plates adjustably attached to said frame opposite said divisions and forming adjustable coupling means for said divided frames, and whereby the diameter of the frame may be altered and carrier-rods connected with said annular frames, substantially as described.

7. In a fruit-gatherer, picker members formed of oppositely-disposed annular frames divided at one side, plates adjustably attached to said frame opposite said divisions and forming adjustable coupling means for said divided frames, one of said plates being extended and sharpened to form a cutting-blade, and carrier-rods connected with said annular frame, substantially as described.

In testimony that I claim the foregoing as my own I have hereto affixed my signature in the presence of two witnesses.

JACKSON HOPKINS.

Witnesses:
S. E. WOODS,
J. C. HICKMAN.